United States Patent
Söderbacka et al.

(10) Patent No.: US 6,665,531 B1
(45) Date of Patent: Dec. 16, 2003

(54) TRANSMISSION SYSTEM FOR RELAYING SHORT MESSAGES

(75) Inventors: Lauri Söderbacka, Espoo (FI); Patrick Gustafsson, Foster City, CA (US)

(73) Assignee: Nokia Corporation, Espoo (FI)

(*) Notice: Subject to any disclaimer, the term of this patent is extended or adjusted under 35 U.S.C. 154(b) by 0 days.

(21) Appl. No.: 09/547,521

(22) Filed: Apr. 12, 2000

Related U.S. Application Data

(63) Continuation of application No. PCT/FI98/00793, filed on Oct. 13, 1998.

(30) Foreign Application Priority Data

Oct. 13, 1997 (FI) .................................................. 973945

(51) Int. Cl.[7] ............................................. H04M 11/10
(52) U.S. Cl. ..................... 455/412; 455/418; 455/420; 455/422; 455/466; 455/558; 709/206; 709/207; 707/500; 340/7.21; 340/7.3
(58) Field of Search .................................. 455/412, 418, 455/517, 466, 558, 420, 422; 340/7.21, 7.3, 7.43; 709/206, 207; 707/500

(56) References Cited

U.S. PATENT DOCUMENTS

| | | | |
|---|---|---|---|
| 5,628,051 A | | 5/1997 | Salin |
| 5,768,509 A | | 6/1998 | Gunluk |
| 6,324,569 B1 | * | 11/2001 | Ogilvie et al. ............... 709/206 |
| 6,421,545 B1 | * | 7/2002 | Christal ....................... 455/566 |
| 6,453,167 B1 | * | 9/2002 | Michaels et al. ........... 455/466 |
| 6,459,360 B1 | * | 10/2002 | Helferich ................... 340/7.52 |
| 6,462,646 B2 | * | 10/2002 | Helferich ................... 340/7.21 |
| 6,487,586 B2 | * | 11/2002 | Ogilvie et al. ............... 709/206 |

FOREIGN PATENT DOCUMENTS

| | | |
|---|---|---|
| EP | 0583064 | 2/1994 |
| EP | 0751627 | 1/1997 |
| GB | 2302752 | 1/1997 |

* cited by examiner

Primary Examiner—William Trost
Assistant Examiner—Danh Le
(74) Attorney, Agent, or Firm—Squire, Sanders & Dempsey L.L.P.

(57) ABSTRACT

A transmission system for relaying short messages comprising a sender of short messages and a receiver of short messages. The short message sender comprises sending means for sending a deleting short message including at least the address of the receiver and the identifier of a short message to be deleted. The short message receiver comprises identification means for identifying the deleting short message and deletion means for deleting the short message according to the identifier of the short message to be deleted in the deleting short message from the memory intended for the short messages of the receiver.

9 Claims, 4 Drawing Sheets

FIG. 3
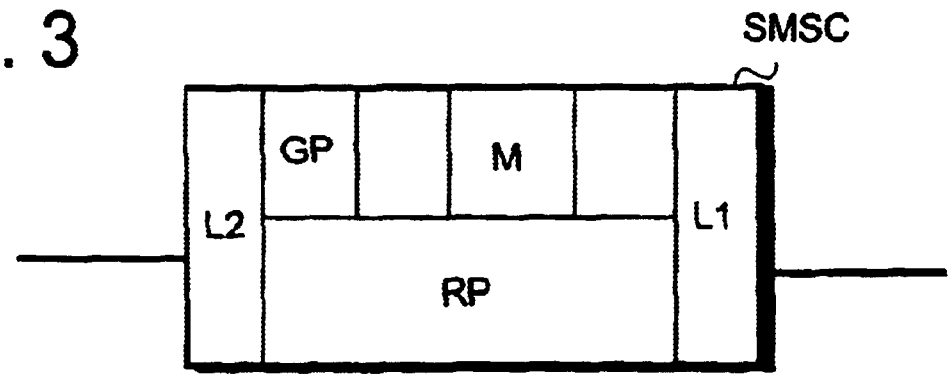
FIG. 4
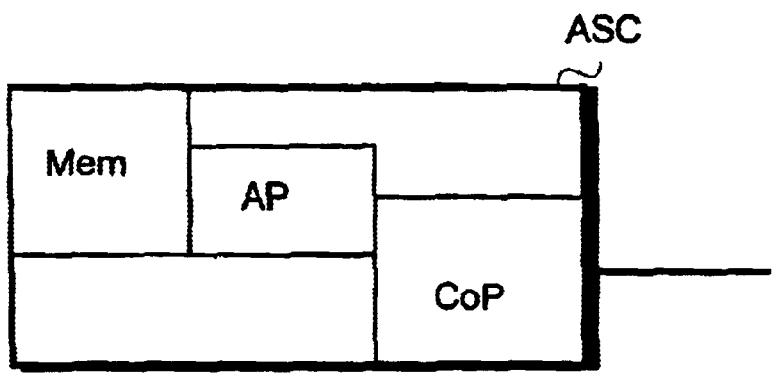
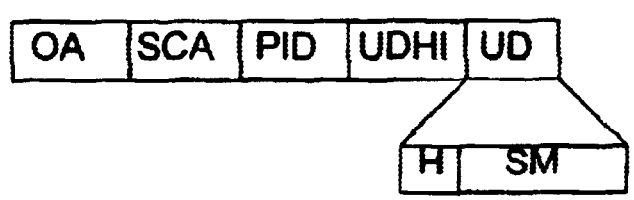
FIG. 5

TRANSMISSION SYSTEM FOR RELAYING SHORT MESSAGES

This application is a continuation of international application serial number PCT/FI98/00793, filed Oct. 13, 1998.

BACKGROUND OF THE INVENTION

The invention relates to short messages to be sent in mobile communication systems and particularly to deleting a short message previously sent.

In addition to normal speech and data connections set up on traffic channels in digital mobile communication systems, short digital data messages sent on control and signalling channels of a system, can be transmitted between actual signalling. These messages are generally referred to as short messages. In order to implement short message service mobile communication systems are generally provided with a short message service centre which forwards short messages, and stores and resends short messages that have not been delivered. All short messages pass through a short message service centre. The short message service centre can receive a short message through any network for delivery to a mobile station and a short message formed by means of the keyboard from the mobile station for further delivery to another mobile station or to another destination.

Services offered to subscribers via short messages increase constantly. Several services delivered in text mode may be offered to a subscriber along with short messages. In addition to normal mobile terminating and mobile originating short messages, a subscriber may receive for instance notices, ads and personal reminders.

A short message received at a mobile station is generally stored in the memory of the mobile station, from where a limited number of memory locations is allocated for short messages. A short message remains in the mobile station memory until the subscriber deletes it. A mobile station can receive short messages only when the mobile station is switched on, in the coverage area of the mobile station and when memory allocated for short messages is available.

A problem with the above arrangement is that the sender of the short message cannot herself/himself delete a short message he/she sent from the memory of the receiver. This is particularly annoying both for the sender and the receiver when the short message has become useless for the receiver. An example of such a message is an ad selling coffee at half price during an hour. Another problem is that a useless message unnecessarily allocates memory intended for short messages and eventually prevents the delivery of a more useful short message when the memory becomes full.

One way to prevent the fulfilment of memory locations intended for short messages is to replace the short message sent by the service producer with a new message. A problem with this solution too, is that a useless short message, for example 'coffee offer ends', allocates one memory location if the mobile station subscriber does not delete the message himself/herself. Hence a short message relaying more important information may not be delivered to the receiver, since the memory locations allocated for short messages are filled. A further problem is that the service producer offers poor service by sending useless information that may irritate the receiver.

BRIEF DESCRIPTION OF THE INVENTION

It is an object of the present invention to provide a solution to the problem mentioned above and to provide a data transmission system where short messages can be deleted remotely controlled. The aim is achieved with a data transmission system, a mobile station, a method and an answering service centre, characterized by what is disclosed in the independent claims.

The term answering service centre refers herein to any speech, fax, data or e-mail box or to another similar mail box receiving messages on behalf of the subscriber and informing the subscriber about a message in the mail box with a short message.

The invention is based on the idea that deletion instructions are sent in a short message, i.e. a deleting short message is sent, which can be a short message deleting a previous one and include a command to delete the previous short message. This allows the sender to remote delete the previously sent short message, which according to the sender has become useless to the receiver. A deleting short message can also be a self-deleting short message including, in addition to a normal text message, an indication of said message being deleted from the memory, for example, in response to reading. A deleting short message provides advantages to the users and producers of answering services in particular. The subscriber no longer needs to remember to delete a short message informing about a message waiting, since the service producer can either after playing the messages send a short message deleting the short message informing about a message waiting from the subscriber memory, or send the short messages informing about the messages waiting as self-deleting short messages. The service producer thus avoids sending useless short messages '0 messages' and correspondingly the receiver does not need to receive short messages including useless information.

In another preferred embodiment of the invention the deleting short message deletes a previously sent short message in the short message service centre where the previously sent short message waits for delivery. This has the advantage that forwarding a useless message is prevented and signalling can be reduced in the network.

In a further preferred embodiment of the invention the mobile station receives a deleting short message, even if no memory allocated for short messages is available. Then, the message is a short message deleting a previous one. This has the advantage that memory can be released and the message waiting for delivery in the short message service centre can be delivered to the mobile station.

Another advantage of the invention is that the changes needed for implementing the invention can be defined for a distinctly determined area mainly for software controlling the mobile station and the short message service centre. Implementing the invention does not interfere with the operation of such network elements, to which the operation of the invention has not been added.

The preferred embodiments of the data transmission system, the mobile station and the answering service centre of the invention are disclosed in the attached dependent claims.

BRIEF DESCRIPTION OF THE DRAWINGS

In the following the invention will be described in greater detail in connection with the preferred embodiments with reference to the accompanying drawings, in which FIG. 3 is a block diagram showing a short message service centre of the invention, FIG. 4 is a block diagram showing an answering service centre of the invention, FIG. 5 illustrates basic elements of a short message of the invention.

DETAILED DESCRIPTION OF THE INVENTION

In the following the invention will be described by using the short message service of the GSM (Global System for Mobile Communications) as an example. The invention is, however, not restricted to the GSM system but can be applied to other similar systems using the same kind of message service, such as DCS 1800 (Digital Communication System), PCN (Personal Communication Network) and mobile communication systems according to TETRA (Trans-European Trunked Radio) standards and third generation mobile communication systems under development.

Figure 1:
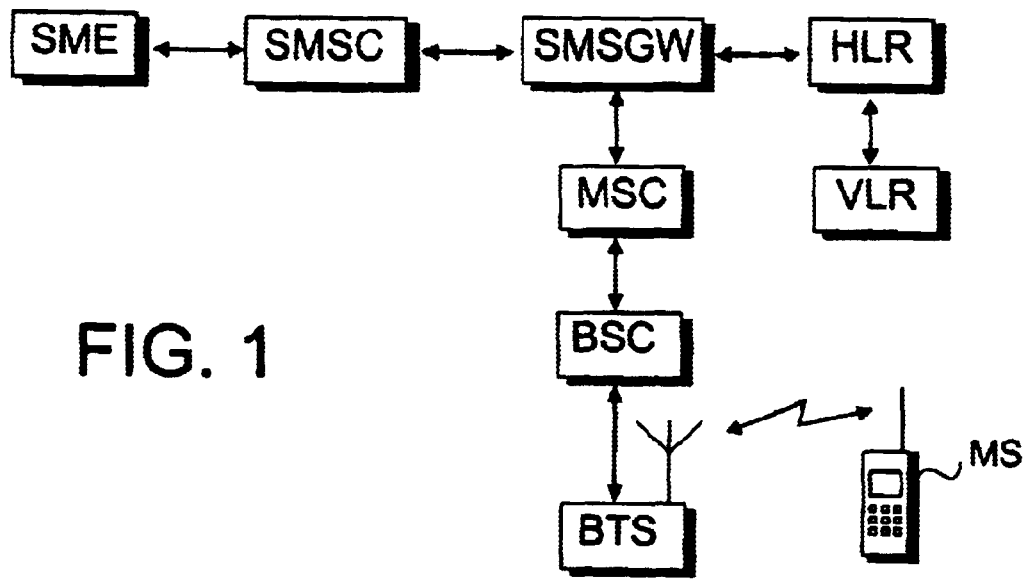
FIG. 1 shows relevant parts of a data transmission system as regards the invention.

FIG. 1 illustrates the basic structural parts of the GSM system which participate in delivering a mobile terminating short message. The structure of the GSM network consists of two parts: a Base Station Subsystem BSS and a Network Subsystem NSS. The BSS and mobile stations MS communicate through radio connections. The operation of the mobile station according to the invention is described in greater detail in FIG. 2. In the base station subsystem BSS each cell is served by a Base Transceiver Station BTS. The base transceiver stations BTS are generally connected in sets of several base stations to a Base Station Controller BSC, whose function is to control the radio frequencies and channels used by the base transceiver station BTS. The base station controllers BSC are connected to a Mobile Switching Centre MSC, whose function is to switch calls including at least one mobile station MS. Some mobile switching centres MSC are connected to other telecommunication networks (not shown in the Figure), such as the Public Switched Telephone Network PSTN, and they comprise relay functions for switching calls to and from these networks. In short message service the mobile switching centre MSC forwards the short message obtained either to the mobile station MS or to a Short Message Serving Centre SMSC.

Two types of data bases are associated with call routing. Subscriber information on all network subscribers including information on the services that the subscriber has access to and the current location of the subscriber are permanently or semi-permanently stored in a home location register HLR. A visitor location register VLR is the other type of register. In general the visitor location register VLR is connected with a single mobile switching centre MSC but it may also serve several switching centres. When a mobile station is active (it has registered in the network, and can start or receive a call), most of the subscriber information on the mobile station MS included in the home location register HLR are loaded (copied) into the visitor location register VLR of the mobile switching centre MSC in the area of which the mobile station MS is. Home and visitor location registers are substantially used in the same way for routing short messages in a mobile communication network as for routing calls.

For short message service the system comprises a short message service centre SMSC and a Short Message Service Gateway SMSGW. The short message service centre SMSC will be described in more detail below in FIG. 3. The short message service gateway SMSGW is the common term for a Gateway Mobile Switching Centre for Short Message Service SMS-GMSC and an Interworking Mobile Switching Centre for Short Message Service SMS-IWMSC. The SMS-GMSC receives a short message from the short message service centre SMSC, requests routing information from the home logation register HLR and delivers the short message through the mobile switching centre MSC to the mobile station MS. Correspondingly the SMS-IWMSC can receive short messages from a mobile station to be forwarded to the short message service centre SMSC.

A Short Message Entity SME can be any means enabling sending and/or receiving short messages. The short message entity can be located in a mobile station, a short message service centre or in a fixed network. An example of the short message entity is an answering service centre that will be described in more detail in FIG. 4.

Short messages are relayed on a control, or signalling, channel between actual signalling. In the GSM system either a connection-specific control channel SDCCH (Stand alone Dedicated Control Channel) or a parallel control channel SACCH (Slow Associated Control Channel) is used for relaying short messages. The latter is used when the mobile station communicates on a traffic channel, or the mobile station is, for example, engaged in a call.

Figure 2:
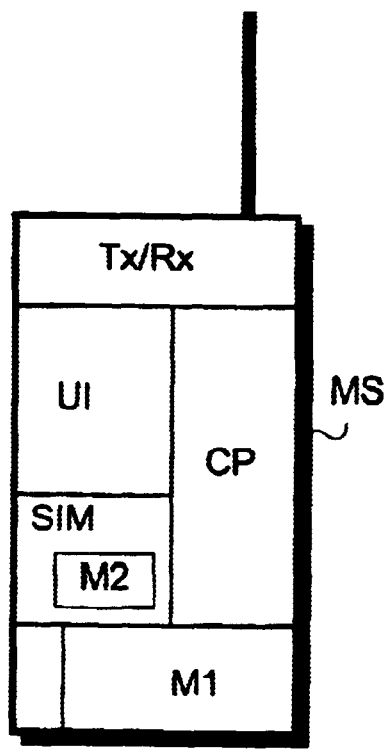
FIG. 2 is a block diagram showing a mobile station of the invention.

FIG. 2 is a block diagram showing the mobile station MS of the invention. In the GSM system the mobile station MS consists of an actual terminal and a subscriber identity unit SIM detachably connected thereto. A SIM card (Subscriber Identity Module) used as the subscriber identity unit in the GSM system is a functional card or a smart card to be located in the mobile station comprising among other things information for identifying the subscriber, such as an IMSI (International Mobile Subscriber Identity) number identifying the mobile station subscriber, and a certain amount of memory M2 for storing short messages received by the mobile station. The actual terminal comprises a transceiver Tx/Rx with antennas, a user interface UI, a controller CP and a memory M1, from where a certain amount is allocated for storing short messages. The mobile station memory thus comprises two parts, a terminal memory M1 and a SIM card memory M2.

The user interface UI generally comprises a keyboard, a display, a loudspeaker and a microphone, not shown in FIG. 2. Using the user interface UI the subscriber can write, send, read, delete and edit short messages and provide the controller CP with further instructions.

The user interface provides the controller CP with, for example, said inputs associated with the short messages. The controller CP can indicate the mobile station MS user of a short message terminated at the mobile station for the subscriber through the user interface UI, for example, with a sound signal and a message or character appearing on the display. The controller CP can also provide the mobile station user through the user interface with sound signals, text instructions or instruction marks associated with the function of the mobile station and/or the mobile communication system.

The controller receives and sends short messages and signalling/control messages, among other things, through a transceiver Tx/Rx. When a short message arrives at the transceiver Tx/Rx, the controller receives the message after checking that memory allocated for short messages still remains. After receiving the short message the controller of the mobile station according to the invention defines the short message type. If the short message is an ordinary message the controller CP stores it either in the SIM card memory M2 or in the terminal memory M1 depending on which memory is used based on the instructions provided by the user. If the short message is a replacing short message the controller CP replaces a previously received short message intended to be replaced with a replacing short message using normal procedures. If the short message is a deleting short message the controller distinguishes from the short message the identifier of the short message to be deleted, the so-called message key, identifying the short message to be deleted with an acceptable accuracy. Examples of the message key are presented below in FIG. 5.

In the first preferred embodiment, where the deleting short message always deletes the previous short message, the controller CP then searches for a short message having the same message key from the memories M1 and M2. When found, the controller CP deletes the short message from the memory, for example, by indicating the memory location allocated by the short message as available. The deleted short message can remain in the memory until a new short message is written over it. The mobile station user can no longer find out the contents of the deleted short message.

The controller CP can be arranged to receive a deleting short message when the memory intended for short messages is filled, even if it would not receive other short messages. This has the advantage that filled short message memory can be freed so as to deliver a short message possibly waiting to be delivered to the mobile station.

The controller CP can also identify a silent short message. Receiving such a short message the controller does not indicate the reception of short messages except for the exceptions presented in FIG. 6. The controller CP does not preferably indicate the reception of a deleting short message, but in some embodiments the short message reception can be indicated.

In the second preferred embodiment of the invention the mobile station controller CP is arranged to delete a short message from the mobile station memory in response to reading the short message, if the controller CP identified the short message as a deleting short message. Then the controller CP can add an indication of the short message being a deleting short message, for example, into a table maintaining status information about short messages in the mobile station memory. The controller CP is generally arranged to indicate reception of a self-deleting short message if the message is not indicated as a silent one.

The mobile station controller CP can be arranged to delete a self-deleting short message also in response to other defined deletion conditions, such as exceeding the storage time set for a short message in a mobile station.

The mobile station controller CP can also be arranged to distinguish between a short message deleting a previous one and a self-deleting short message, and to operate in accordance with the received deleting short message type.

The controller CP can maintain a list of deleted short messages. The mobile station user can through a user interface prevent the controller CP from deleting short messages by deactivating a deletion function. Deletion can, in turn, be activated through the user interface.

When sending short messages from a mobile station the controller CP can provide instructions through the user interface for sending a deleting short message, the controller then being arranged to adapt the short message to resemble a short message deleting a previous one or a self-deleting short message and to send it to the short message service centre. If the short message is of the type deleting the previous one, i.e. aims to delete a short message, which has previously been delivered to the same address, the mobile station informs the short message service centre about it simultaneously as it sends the short message.

However, for the mobile station of the invention it is enough to identify the deleting short message and to be able to delete the short message intended for deletion.

FIG. 3 is a block diagram showing the short message service centre SMSC of the invention. The short message service centre SMSC comprises a connection part L1 for receiving and sending short messages through a short message service gateway SMSGW to and from a mobile station of a mobile communication system. The short message service centre SMSC may comprise connection parts L2 (only one shown in the Figure) for connecting the short message service centre to other networks, such as the PSTN and/or directly to answering services connected to the short message service centre. These connection parts allow short messages or other messages, such as e-mail, from which short messages are formed or which are formed in the connection parts L1, L2 responsible for the short messages to be sent and received. In addition, the short message service centre comprises a relay part RP forwarding the short message received by the short message service centre SMSC. The relay part RP also stores the short message that has not been delivered in its memory M and retrieves the short message therefrom according to given instructions, when the short message can be successfully delivered. Furthermore, the short message service centre may comprise a generation part GP of the message for generating short messages according to instructions given by an answering service, for example.

The relay part RP of the short message service centre SMSC of the invention identifies a deleting short message which is a short message deleting the previous short message. The short message service centre SMSC checks before forwarding the deleting short message, if a previously received short message, preferably of the same type, sent from the same source address to the same destination address is stored in a memory M to wait to be forwarded. If yes, the relay part RP deletes the short message waiting from the memory M and thereafter 'forgets' the deleting short message, i.e. neither forwards it nor stores it in the memory M. If the short message to be deleted is not in the memory M, the relay part RP normally transfers the deleting short message through the connection part to be delivered to the receiver.

The relay part RP of the short message service centre SMSC of the invention may also identify a silent replacing message. Then the relay part can replace a previously received short message in the memory, if the same source address requires it with the same receiver address using the same message type. A silent replacing message replaces almost the entire old message, only the header data informing about the silence of the message is not touched. Then the message is transferred to the receiver as a silent or an indicating message according to how an overwritten message would have been transferred. This has the advantage that if the sender has intended the first message to be indicated to the receiver, the first received message will be indicated even if the contents were the contents of another message.

FIG. 4 is a block diagram showing an answering service centre ASC of the invention comprising a connection part CoP, an application part AP and a memory Mem for storing received messages.

A connection part CoP receives messages arriving at the answering service from the network or apparatus relaying messages and informs the short message service centre to which it is connected about the received messages. Alternatively the connection part CoP may relay a command to the short message service centre for generating the short message.

The application part AP maintains information on how many messages the memory Mem contains for each subscriber, and always informs the subscriber about receiving a new message by generating a short message or by giving a generation command to the short message service centre through the connection part CoP. The short message can either inform about the arrival of the message or about playing the message, for example, listening to the total number of messages waiting. The short message may be an ordinary or a replacing message according to how the service provider has programmed the application part AP.

In the first preferred embodiment of the invention the application part AP of the answering service centre ASC maintains information on how many unplayed messages the subscriber has. When all messages have been played, the application part AP generates (or issues a command to generate) the deleting short message to the subscriber and sends it through the connection part CoP. The purpose of a deleting short message is to delete a previous short message possibly in the mobile station memory of the subscriber that informed about the number of unread messages. Such a deleting short message is referred to as a short message deleting the previous one. The advantage this solution offers for deleting an undistributed short message in the short message centre, provided by current technology, is that a previously sent short message can be deleted irrespective of whether it has been distributed, or delivered, to the mobile station or not.

In the second preferred embodiment of the invention the application part AP of the answering service centre ASC sends all short messages as deleting short messages, each short message sent to the subscriber thus comprising deletion instructions, on the basis of which the short message is deleted from the mobile station memory of the subscriber preferably in response to the subscriber having read the message. Such deleting short messages are referred to as self-deleting messages. The advantage this solution offers is that the number of short messages to be sent is reduced. The network load is also reduced when self-deleting short messages are used. However, the subscriber may want to keep the short message just read in the mobile station memory as a reminder of unplayed messages. This is possible when using the short messages deleting the previous messages according to the first preferred embodiment.

An answering service producer can program the application part AP to operate so as to send short messages and a short message deleting the previous message or only self-deleting short messages to the subscriber according to his/her own choice.

The application part AP can be arranged to send short messages informing about received messages as silent short messages, in which case the mobile station of the subscriber does not indicate short message reception. For example, if the answering service receives a first unplayed message for the subscriber, an ordinary short message thereof is sent and reception is indicated. The short messages informing about the following messages are sent as silent short messages. This has the advantage that the subscriber, who already knows that at least one message is waiting in the answering service, is not unnecessarily disturbed. This preferred embodiment of the invention is applicable, even if no short message remote deletion is implemented in the answering service by a short message deleting the previous one, a self-deleting short message or by a combination of the two. All messages to be sent, such as the replacing, self-deleting, replacing self-deleting short messages and short messages deleting the previous one can be indicated as silent short messages.

FIG. 5 shows the parts of the basic elements of the mobile terminating short message of the GSM system that can be used to implement the invention. The basic elements may be within each other, their order may differ from what is shown in the Figure and their names may differ from what is presented herein. What is essential is to transfer the information in the elements. A basic element OA (Originating Address) reveals the address of the sender and a basic element SCA (Service Centre Address) indicates the address of the short message service centre. A basic element PID (Protocol Identifier) either refers to an upper level protocol used or indicates relay to a certain type of telematic service. Replacing short messages, for example, are indicated by the basic element PID. A basic element UDHI (User Data Header Indicator) informs whether a basic element UD (User Data) includes a header. The UD field contains the actual short message SM. In addition, it may contain a separate header H. The header H can be used to indicate whether the message is a silent short message, a self-deleting short message, a short message deleting the previous one, a silent self-deleting short message or a silent short message deleting the previous one. Furthermore, the header H may comprise a message indicator enabling a more accurate identification of the message to be deleted. Depending on the application it is not necessary to distinguish between a short message deleting the previous one and a self-deleting short message. Alternatively the short message basic element PID can be used for similar purposes. In addition, the information in the PID basic element can be combined with the information in the header H, for example, to indicate a silent replacing self-deleting short message. Using the basic elements a message key of the short message to be deleted can be formed.

In the first preferred embodiment, where short messages deleting the previous one are used, the message key is formed of the basic elements OA and SCA and of the message indicator in the header. Using these three elements the message to be deleted can be identified. The message indicator can, for example, be an index number of a previously sent message. The sender of the deleting short message provides a message indicator value when preparing a short message deleting the previous one. If no value is given for the message indicator, all messages sent by the sender to the mobile station through the same short message service centre, i.e. the ones with the same OA and SCA, are deleted in the first preferred embodiment. In the other embodiments, where a short message deleting the previous one is used, the information in the message can be used to identify the message to be deleted; on the basis of the information the message can be identified with an acceptable accuracy. In order to ensure accuracy the deletion of all previously sent short messages from memory may be enough. For this purpose the same OA is enough.

In the second preferred embodiment, where self-deleting short messages are used, information on self-deletion is enough for the message key, or the identifier, as long as the deletion information is stored in the mobile station in such a way that it is possible to know where the short message is directed.

Corresponding fields can be used also in the short message service centre. Though, instead of the short message service centre address SCA a destination address, or a mobile station address, can be used in the message key.

Figure 6:
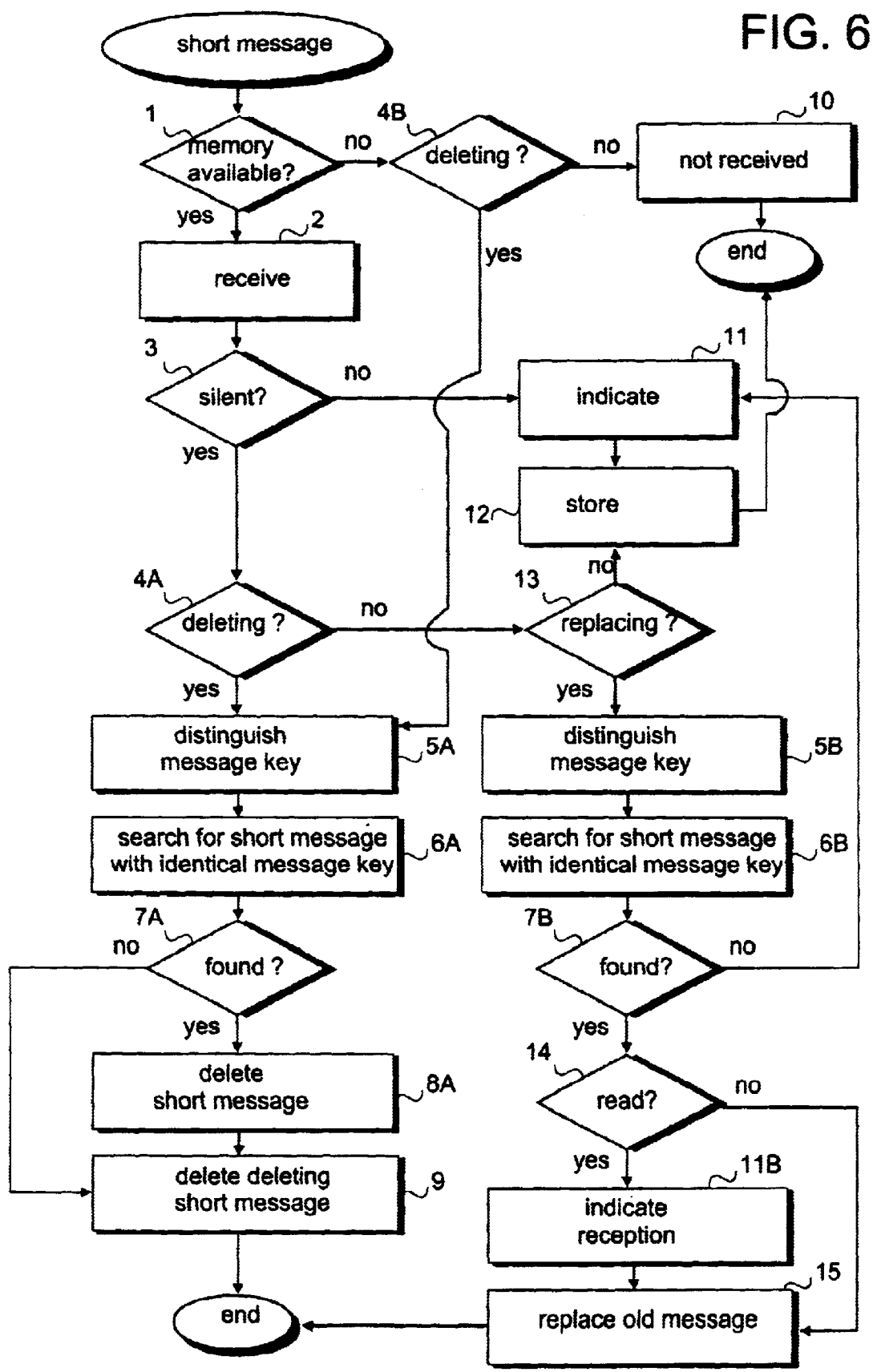
FIG. 6 is a flow chart illustrating a first preferred embodiment of the invention.

FIG. 6 is a flow chart showing the first preferred embodiment of the invention where the deleting short message is a short message deleting the previous one. The Figure starts with a short message that has just arrived at the mobile station. At first in step 1 it is checked, whether there is any free memory in the mobile station for a short message. If there is, the short message is received in step 2 and in step 3 it is checked if the short message is a silent one. If the short message is silent, it is then checked in step 4A if it is a deleting one. If the short message is a deleting one a message key is distinguished from the short message in step 5A. The message key should be such that it enables the identification of the short message to be deleted with an acceptable accuracy. When the message key is distinguished from the short message, a short message containing the same message key is searched for in the memory in step 6A, and if such a message is found (step 7A) it is deleted from the short message memory in step 8A. To delete from memory here means to free memory. The short message can still remain in the memory but it cannot be read instead it can be overwritten by a new short message. Thereafter in step 9 a deleting short message is deleted. If the short message to be deleted is not found (step 7A) the deleting short message is deleted in step 9.

If it is observed in step 1 that no free memory is available for short messages, it is checked in step 4B if the short message is a deleting one. If it is, the process proceeds to step 5A and continues in accordance with the description above. If it is not a deleting one, no short message is received (step 10).

If it is observed in step 3 that the short message is not a silent one, the reception of the short message is indicated in step 11 and the short message is stored in the memory in step 12. Steps 11 and 12 may as well occur in the reverse order or simultaneously.

If it is observed in step 4A that the short message is not a deleting one, it is checked in step 13 if the message is a replacing short message. If it is not a replacing short message, the short message is stored in the memory in step 12 without indicating the reception thereof, since it is a silent short message.

If the message is a replacing short message (step 13) a message key is distinguished from the short message in step 5B. When the message key is distinguished from the short message another short message comprising the same message key is searched for in the memory in step 6B, and if such a message is found (step 7B) it is checked in step 14 if the short message is read. If the short message is read, the reception of the short message is indicated in step 11B, even though the short message is indicated as a silent one. Using indication the receiver of the short message is informed of the change in the short message contents. After indication or simultaneously with it the old message in the memory is replaced by a new replacing short message in step 15. If the replacing short message is not read the procedure proceeds straight from step 14 to step 15. This has the advantage that the short message reception is not indicated again, as the previous indication is still valid, i.e. the receiver knows that he/she has a message waiting.

If no replacing short message is found in step 7B, the reception of the short message is indicated in accordance with step 11 and the short message is stored in the memory in step 12. Using indication the receiver is informed of the reception of the new short message and memory is allocated. Thus, the user may immediately check the contents of the message and delete the message from the memory.

Alternatively a silent replacing short message can always be left unindicated or be indicated only when no replacing short message is found. The replacing short message does not have to be a silent one either. Then the reception thereof is always indicated and the functions in steps 5B, 6B, 7B and 15 or in step 12 are performed.

In the other preferred embodiments, where a short message deleting the previous one is used, it can be checked at first if the message is a deleting short message (step 4A) and if it is not, then check if the message is a silent one (step 3). The silence of the message can also be checked after checking that the message is a replacing one. When the memory allocated for short messages is filled there is no need to check if the short message is a deleting one (step 4B) but the procedure may proceed straight to step 10, i.e. no short messages are received. When the short message is a deleting one it is possible to return to step 6A to search for a new short message according to the message key after deleting the previously sent short message from the memory (step 8A). This is repeated until no short messages to be deleted are found in the memory. One deleting short message thus enabling the deletion of all previous short messages of the sender depending on the message key.

Figure 7:
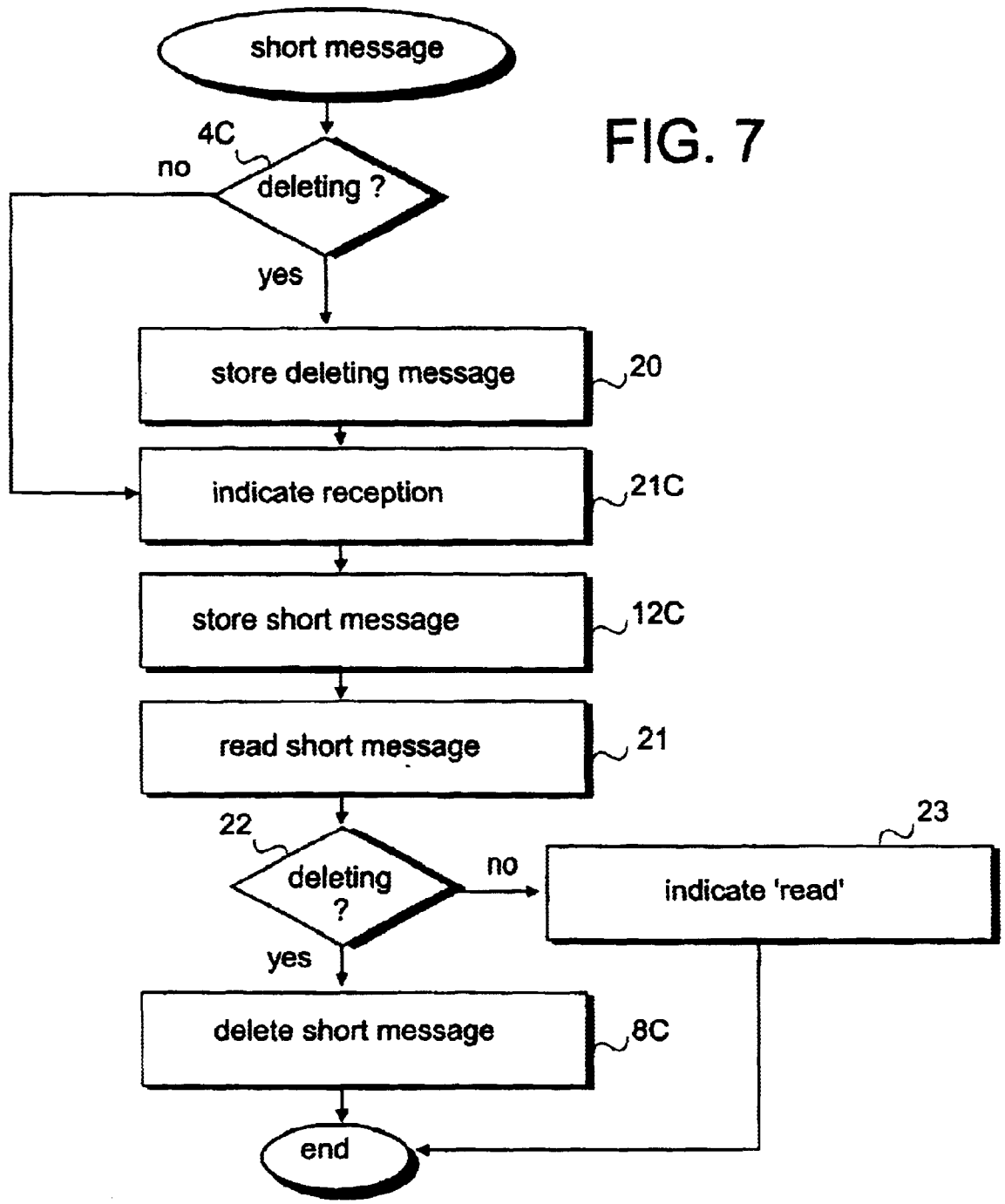
FIG. 7 is a flow chart illustrating a second preferred embodiment of the invention.

FIG. 7 shows the second preferred embodiment of the invention, where the deleting short message is only a self-deleting short message. It is also assumed that silent short -messages and/or short messages to be replaced are not used. When a short message is received it is checked in step 4C if the message is a deleting one. If it is, an indication of the short message being a short message to be deleted is stored in step 20, for example, in a table maintaining status information on short messages. In this table each piece of status information focuses on a particular short message, thus enabling to find the correct short message in the memory. Thereafter the reception of the short message is indicated (step 11C) and the short message is stored in the memory (step 12 C). Steps 20, 11C an 12C can be performed in reverse order or simultaneously. When the short message is read in step 21, it is then checked in step 22, for example, in the status information maintaining table if the short message is to be deleted. If the short message is a short message to be deleted, it is deleted from the memory in step 8C. To delete from memory here means to free memory. The short message can still remain in the memory but it cannot be read, instead a new short message can be written over it. If the short message is not a short message to be deleted (step 22), it is indicated in the status table in step 23 that the short message has been read.

A self-deleting short message can be a silent, replacing or silent and replacing short message, although these alternatives are not shown in FIG. 7. A self-deleting short message can also be deleted in response to something else than reading the short message shown in step 21. An example of such an alternative is the deletion of a short message from the mobile station memory in response to exceeding the short message storage time possibly set in the mobile station.

It is obvious for those skilled in the art how the methods presented in FIGS. 6 and 7 can be combined, for example, by checking from a received deleting short message, whether it is a short message deleting the previous one or a self-deleting short message and depending on the reply continuing either from step 5A in FIG. 6 or from step 20 in FIG. 7.

It is understandable that the above description and the Figures related thereto are only intended to illustrate the present invention. Different variations and modifications to the invention will be apparent to those skilled in the art, without departing from the scope and spirit of the invention defined in the appended claims.

What is claimed is:

1. A transmission system for relaying short messages, the system comprising a sender of short messages, the sender comprising sending means for sending a self-deleting short message including at least the address of the receiver, and a receiver of short messages, the receiver including a memory for storing received short messages and comprising storing means for storing the received short messages to the memory, identification means to identify the self-deleting short message and deletion means for deleting from the memory a self-deleting short message in response to reading the self-deleting short message.

2. A transmission system as claimed in claim 1, further comprising means for sending a deleting short message for deleting a previously sent short message, the deleting short message including at least the address of the receiver and the identifier of the short message to be deleted, wherein the identification means are arranged to distinguish between a self-deleting short message and a deleting short message, the deletion means are arranged to delete from the memory the short message indicated in the deleting short message and the receiver is arranged to receive a short message when the memory is filled, if the short message is a deleting short message.

3. A transmission system as claimed in claim 2, wherein the receiver is a mobile station comprising indication means for indicating reception of a short message and the identification means are arranged to deactivate the indication means in response to the reception of the deleting short message.

4. A transmission system as claimed in claim 2, further comprising a controller relaying short messages from the sender to the receiver, the controller comprising a memory for storing the short messages that the controller cannot deliver to the receiver, identification means for identifying a deleting short message, and deletion means for deleting, in response to receiving a deleting short message, from the memory a short message indicated in the deleting short message, the indicated short message being previously received from the sender to be relayed and waiting to be delivered to the receiver.

5. A mobile station comprising reception means for receiving short messages, a memory including memory locations for storing the received short messages, storing means for storing the received short messages to the memory, identification means for identifying the received short message as a self-deleting short message, and deletion means for deleting from the memory the self-deleting short message in response to reading the self-deleting short message by freeing the memory location of the short message.

6. A mobile station as claimed in claim 5, wherein the identification means are arranged to identify a deleting short message for deleting a previously sent short message and to distinguish between a self-deleting short message and a deleting short message, the reception means are arranged to receive the short message when all memory locations are filled, if the message is a deleting short message, the deletion means are arranged, in response to receiving a deleting short message, for distinguishing a message key identifying a short message to be deleted from the deleting short message, for searching from the memory a short message having an identical message key to the one distinguished and for freeing the memory location of the short message.

7. A mobile station as claimed in claim 6, further comprising indication means for indicating reception of the short message, wherein the identification means are arranged to deactivate the indication means in response to the deleting short message.

8. A mobile station as claimed in claim 5, further comprising a user interface through which the user can activate and deactivate the deletion means.

9. An answering service centre of a mobile communication system comprising information means for informing a subscriber about a message arrived at the answering machine by an information short message, the information means being arranged to add an indication to the information short message, the indication indicating that the short message is a self-deleting short message which is deleted from the mobile station memory of said subscriber in response to reading it.

* * * * *